(12) United States Patent
Park

(10) Patent No.: US 6,687,518 B1
(45) Date of Patent: Feb. 3, 2004

(54) PORTABLE TERMINAL FOR GMPCS

(75) Inventor: Jun-Sang Park, Anyang-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/503,517

(22) Filed: Feb. 14, 2000

(30) Foreign Application Priority Data

Feb. 13, 1999 (KR) .......................................... 1999-5266

(51) Int. Cl.[7] ................................................ H04B 1/38
(52) U.S. Cl. ........................ 455/575; 455/90; 455/347; 379/433.01
(58) Field of Search ........................ 455/90, 575, 347; 348/14.01, 14.02, 333.01, 373, 374, 375, 376; 379/433.12, 433.13, 447, 433.01

(56) References Cited

U.S. PATENT DOCUMENTS

| | | | | |
|---|---|---|---|---|
| 4,903,326 A | * | 2/1990 | Zakman et al. | 455/575 |
| 5,642,257 A | * | 6/1997 | Saito et al. | 361/680 |
| 5,915,020 A | * | 6/1999 | Tilford et al. | 455/3.02 |
| 5,960,332 A | * | 9/1999 | Michalzik | 455/90 |
| 6,108,716 A | * | 8/2000 | Kimura et al. | 710/1 |
| 6,148,183 A | * | 11/2000 | Higdon et al. | 455/90 |
| 6,259,932 B1 | * | 7/2001 | Constien | 455/556 |
| 6,266,234 B1 | * | 7/2001 | Leman | 361/680 |
| 6,323,902 B1 | * | 11/2001 | Ishikawa | 348/373 |
| 6,337,671 B1 | * | 1/2002 | Lee | 343/901 |

* cited by examiner

Primary Examiner—Edward F. Urban
Assistant Examiner—Simon Nguyen
(74) Attorney, Agent, or Firm—Cha & Reiter, L.L.C.

(57) ABSTRACT

A portable terminal for providing global, mobile personal communication by satellite GMPCS. The portable terminal comprising a main housing; a sub-housing having an LCD on which a variety of information is displayed and a lens which is arranged next to the LCD for providing picture communication; a foldable keyboard for inputting data; data communication means equipped to the respective main housing and the foldable keyboard for enabling the wireless data transmission and reception between the main housing and the folder type keyboard; a hinge means for mechanically connecting the sub housing to the main housing; an antenna housing having a battery cell for supplying power and a satellite communication antenna; a guide means for slidingly mounting the antenna housing to the main housing; a first connection means for electrically connecting the main housing and the satellite communication antenna to each other; and second connection means for electrically connecting the main housing and the battery cell to each other.

14 Claims, 7 Drawing Sheets

PORTABLE TERMINAL FOR GMPCS

This application makes reference to, incorporates the same herein, and claims all benefits accruing under 35 U.S.C. Section 119 from an application for PORTABLE TERMINAL FOR GMPCS filed earlier in the Korean Industrial Property Office on Feb. 13, 1999 and there duly assigned Ser. No. 5266/1999.

BACKGROUND OF THE INVENTION

1. Field of the Invention

The present invention relates to a portable terminal, and more particularly, the present invention relates to a portable terminal for global mobile personal communication by satellite (GMPCS), which enables a user to implement satellite communication on earth.

2. Description of the Related Art

Generally, a portable terminal used on earth is referred to as HHP (hand-held programming device), PCS (personal communication system) phone, an analog type or digital type cellular phone, etc. Mainly, these terminals perform the audio transmission function through a link, which is constituted by a number of portable terminals, a base station, a mobile telephone exchange, and a public telephone network.

However, the conventional portable terminal does not fully meet the demand of the users who desire more of an information-oriented service. In other words, as the conventional portable terminal is mainly used for audio transmission, a user is limited to implement only audio communication with another party. Consequently, the conventional portable terminal can not address the need of information-oriented users.

Moreover, the conventional portable terminal encounters problems in that, it is impossible to implement picture communication with another party. Also, in the conventional portable terminal, as the antenna is integrally fastened to the body of a portable terminal, there exist difficulties in miniaturizing or designing the simple body.

Furthermore, as the conventional portable terminal, such as laptop, enables data communication with another party and performs the transmission of a variety of messages, the weight of the terminal is increased, thus it is inconvenient for people to carry around a bulky portable terminal.

SUMMARY OF THE INVENTION

Accordingly, the present invention has been made in an effort to solve the problems occurring in the related art, and thus a primary object of the present invention is to provide a portable terminal capable of providing the satellite communication.

Another object of the present invention is to provide a portable terminal for the GMPCS that uses a BLUETOOTH device to enhance the convenience of implementing a local area data communication or picture communication.

Still another object of the present invention is to provide a portable terminal for the GMPCS in which an antenna is constructed in a manner such that it can be mounted or dismounted from the main housing of the terminal.

Yet a further object of the present invention is to provide a portable terminal for the GMPCS that uses a BLUETOOTH device, thereby enabling a folder-type keyboard serving as a data inputting means to be conveniently carried around by users.

In order to achieve the above objects, according to the present invention, there is provided a portable terminal for the GMPCS comprising: a main housing; a sub housing having an LCD on which a variety of information is displayed, and a lens which is arranged below the LCD for enabling the picture communication; a folder-type keyboard for inputting data; a data communication means equipped to the respective main housing and the folder-type keyboard for enabling the wireless data transmission and reception between the main housing and the folder-type keyboard; a hinge means for mechanically connecting the sub housing to the main housing; an antenna housing having a battery cell for supplying power and a satellite communication antenna; a guiding means for slidingly mounting the antenna housing to the main housing; a first connection means for electrically connecting the main housing and the satellite communication antenna to each other; and a second connection means for electrically connecting the main housing and the battery cell to each other.

BRIEF DESCRIPTION OF THE DRAWINGS

The above objects and advantages of the present invention will become more apparent by describing in detail the preferred embodiments thereof with reference to the attached drawings in which.

A DETAILED DESCRIPTION OF THE PREFERRED EMBODIMENTS

Figure 1:
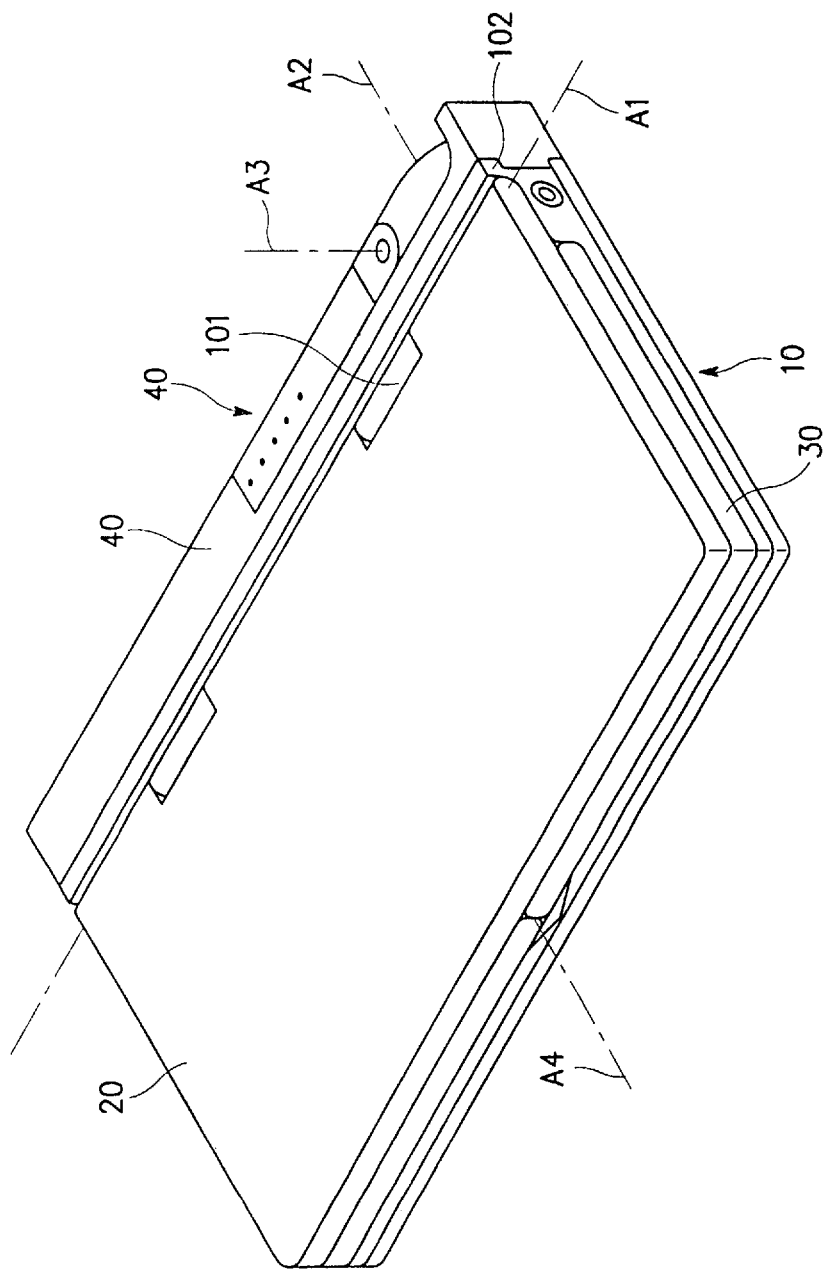
FIG. 1 is a perspective view illustrating a portable terminal for the GMPCS in a closed state in accordance with the preferred embodiment of the present invention.

Reference will now be made in greater detail to the preferred embodiments of the present invention. In the drawings, the same or similar elements are denoted by the same reference numerals even though they are depicted in different drawings. For the purpose of clarity, a detailed description of well-known functions and configurations incorporated herein will be omitted when it may make the subject matter of the present invention rather unclear.

A GMPCS system designates a system wherein several tens or several hundreds of satellites are put in a lower orbit or in an intermediate orbit. Accordingly, a user is able to enjoy the mobile telecommunication and the data communication at any place all over the world using a terminal which enables the satellite communication.

The GMPCS system provides a diverse mobile service by using a portable terminal capable of satellite communication via satellites and gateway stations on earth. In other words, the GMPCS system supports the mobile telephone communication, the wireless data communication, and the position confirmation service, etc. Accordingly, the GMPCS system renders wide band serviceability and also provides the convenience of providing a variety of services and a high-level satisfaction for the information-oriented users. By virtue of the portable terminal providing the satellite communication, a user can always afford the voice service or implement the picture communication with another party at any lace.

Figure 2:
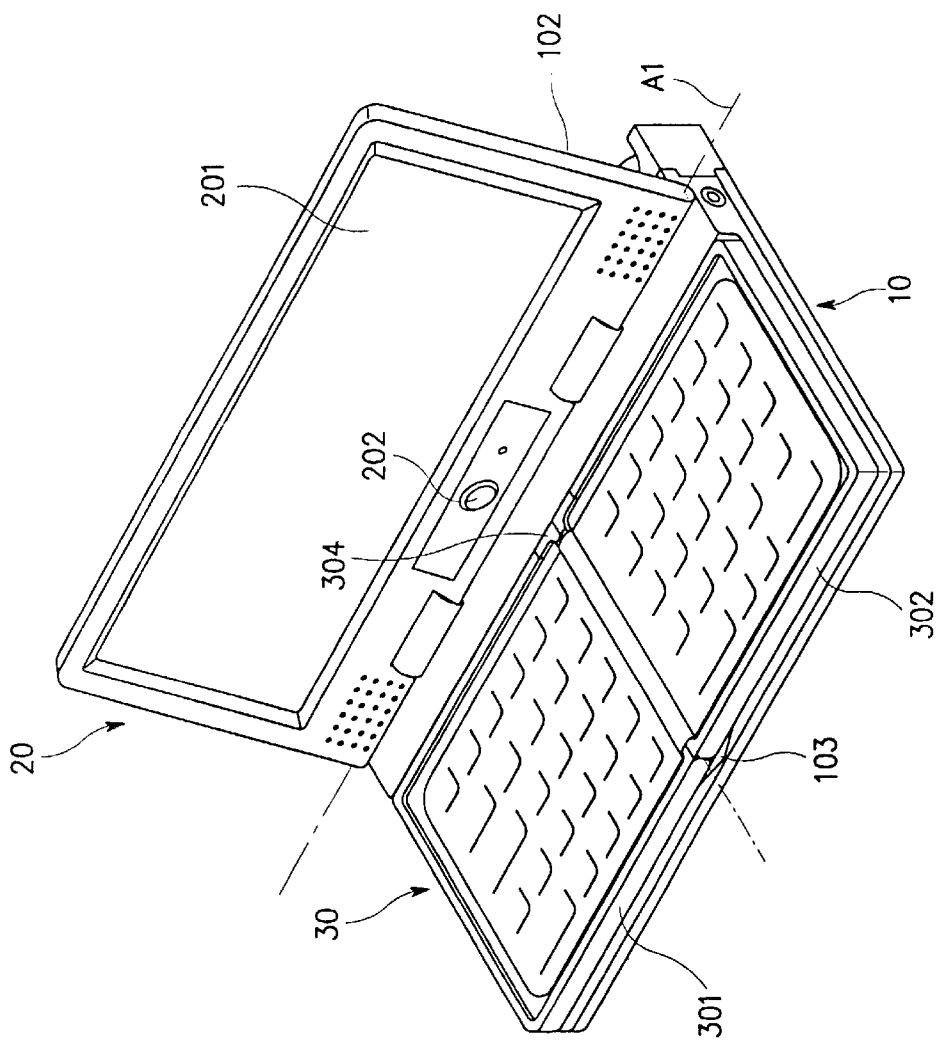
FIG. 2 is a perspective view illustrating the portable terminal for the GMPCS in an open state in accordance with the preferred embodiment of the present invention.

Referring to FIGS. 1 and 2, there is shown a portable terminal for global mobile personal communication by satellite (GMPCS), which is used by a user on earth.

The portable terminal for the GMPCS according to the present invention largely includes a main housing 10, a sub housing 20, and a hinge means (not shown) which connects the main housing 10 and the sub housing 20 to each other. The sub housing 20 is opened from and closed to the main housing 10 at a predetermined angle dictated by the hinge means. Accordingly, the hinge means mechanically connects the main housing 10 and the sub housing 20 to each other. Also, the main housing 10 and the sub housing 20 are electrically connected to each other using a flexible printed circuit (not shown), which is well known in the art. For the purpose of clarity, specific details such as particular architecture, components, interfaces, techniques, etc., provided inside the terminal for enabling the communication are omitted.

The main housing 10 is formed at a rear end thereof with a guide holder 102 for limiting the opening and the closing angles of the sub housing 20 at a predetermined angle. The main housing 10 includes a pair of hinge arms 101 so as to be connected with the sub housing 20. The pair of hinge arms 101 is arranged along one end of the main housing 10 and rotabably coupled to one end of the sub housing in a manner such that they are symmetric to each other.

The main housing 10 includes a foldable keyboard 30 for inputting a variety of data and an antenna housing 40 which includes a satellite antenna 401 for satellite communication. The foldable keyboard 30 can be attached to and detached from the main housing 10, and the antenna housing 40 can be mounted or dismounted from the main housing 10. The foldable keyboard 30 can be expandable to become a full size keyboard.

The sub housing 20 can be rotated about the hinge axis A1 from the main housing 10. The satellite communication antenna 401 can be primarily rotated about a hinge axis A2 and secondarily rotated about a hinge axis A3. The sub housing 20 includes an LCD 201 on which a variety of data is displayed thereon and a lens 202 which is used for implementing the picture communication. The data inputted through the foldable keyboard 30 is displayed on the LCD 201, and the lens 202 is positioned just below the LCD 201 for enabling picture communication with another party.

The foldable keyboard 30 includes a BLUETOOTH device 304 which allows the data to be transmitted and received wirelessly, and the main housing 10 also includes a BLUETOOTH device 103 which allows the data to be wirelessly transmitted and received. That is, if the foldable keyboard is located substantially close to the main housing 10, the keyboard can communicate wirelessly with the main housing 10 as well as other main housing belong to other user; otherwise, the keyboard can be wirelessly connected to the main housing 10 through a mobile phone equipped with BLUETOOTH functionality. Namely, the main housing 10 and the foldable keyboard 30 can wirelessly transmit and receive the data using the BLUETOOTH devices 103 and 304, respectively. Here, BLUETOOTH, which is well-known in the art, denotes a protocol by which the data communication is realized in the form of wireless local area communication through electric waves.

By this protocol, the user can carry the main housing as needed. If the user is carrying a mobile phone and a foldable keyboard, he or she can leave the main housing at home or office to serve as a server, and conduct data communication by establishing the communication link between the foldable keyboard and the main housing through the mobile phone. Thus, a user in a remote area, using the detachable keyboard, can conduct the data transmission with the aid of the mobile phone and the display unit of the mobile phone. Further, it is possible to communicate with another party's information and communication device while one's portable information and communication device is held in a case or a pocket While the infrared data association (IrDA) protocol is mostly adopted presently as the means of local area communication, it is expected that the BLUETOOTH protocol will be widely used in the future. The BLUETOOTH protocol will be the most preferable communication means when implementing the local area communication. The BLUETOOTH protocol is increasingly used for interfacing a personal computer with a portable radio telephone or a personal digital assistant (PDA). Moreover, the BLUETOOTH can be utilized not only for character data transmission and voice data transmission but also in a password-related technique for maintaining the communication security.

The BLUETOOTH device which is applied to the present invention, is implemented in the main housing 10 and the foldable keyboard 30, and further implemented in the mobile phone. In other words, in the portable terminal for the GMPCS according to the present invention, the BLUETOOTH device 103 is arranged at a predetermined location on the main housing 10 and another BLUETOOTH device 304 is arranged at another predetermined location on the foldable keyboard 30.

Figure 3:
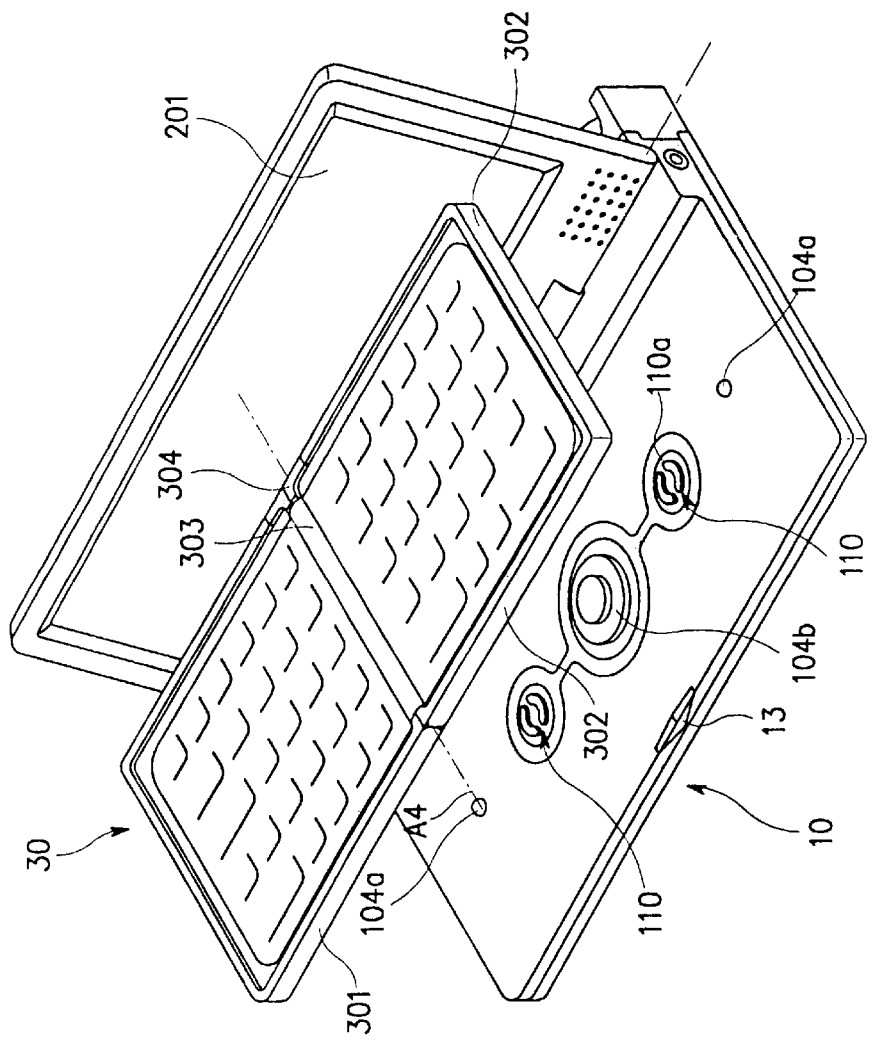
FIG. 3 is an exploded perspective view illustrating the portable terminal for the GMPCS in accordance with the preferred embodiment of the present invention.
Figure 4:
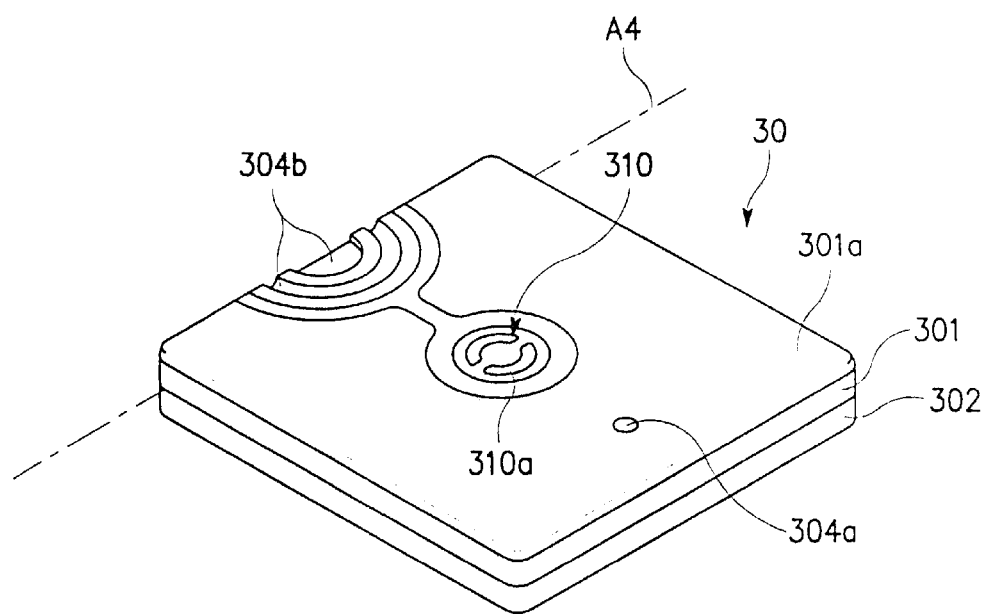
FIG. 4 is a perspective view illustrating the foldable keyboard in accordance with the preferred embodiment of the present invention.

As shown in FIGS. 3 and 4, in the portable terminal for the GMPCS according to the present invention, the foldable keyboard 30 can be attached to and detached from the main housing 10. That is to say, the portable terminal of the present invention includes a detachable means for attaching and detaching the folder type keyboard 30 to and from the main housing 10, respectively. Also, according to the present invention, the first holding means is additionally provided for guiding and assembling the position between the folder type keyboard 30 and the main housing 10 when the folder type keyboard 30 is attached to the main housing 10.

The folder type keyboard 30 includes a first keyboard housing 301, a second keyboard housing 302 and a hinge arm 303 which mechanically connects the first keyboard housing 301 and the second keyboard housing 302 to each other. The first keyboard housing 301 is opened from and closed to the second keyboard housing 302 about the hinge axis A4.

It is preferred that the attachment and detachment means for the folder type keyboard 30 comprises magnets. It is also preferred that the first holding means for guiding the assembling positions, between the folder type keyboard 30 and the main housing 10 when the folder type keyboard 30 is attached to the main housing 10, comprise projections and grooves. In this connection, the grooves 304a and 304b are defined on a lower surface 301a of the first keyboard housing 301 of the foldable keyboard 30, and the projections 104a and 104b are formed on the bottom surface of the main housing 10 at predetermined places which correspond to the grooves 304a and 304b, respectively.

On the contrary, the projections may be formed on the folder type keyboard 30, and the grooves may be defined in the main housing 10 at the preset places which correspond to the projections, respectively. At this time, it is preferred that the projection 104a and the groove 304a have a semi-spherical contour. Also, it is preferred that at least one of the projections 104a and 104b and at least one of the grooves 304a and 304b are provided to the main housing 10 and the folder type keyboard 30. Moreover, while it is described in the above statements that the attachment and detachment means between the main housing and the folder type keyboard 30 comprises a pair of magnets 110 and 310, it can include a set of groove and projection which correspond to each other.

For example, assuming that the magnet 310 having an N polarity is disposed on the lower surface of the folder type keyboard 30 and the magnet 110 having an S polarity is disposed on the bottom surface of the main housing 10, the magnet 310 of the N polarity has a circular projection 310a and the magnet 110 of the S polarity has a circular groove 110a. By attractive force which is induced between the pair of magnets 110 and 310, the foldable keyboard 30 and the main housing 10 can be coupled with each other by engaging the magnetic groove 110a to the magnetic projection 310a.

As shown in FIG. 3, if a variety of data is inputted through the foldable keyboard 30, the data is transmitted through the BLUETOOTH devices 103, 304 to the main housing 110 to be displayed on the LCD 201. Further, in the case that the main housing 10 and the folder type keyboard 30 are detached from each other so that the main housing 10 is held in a substantially distant area and the folder type keyboard 30 is held in the pocket of a user, the portable terminal for the GMPCS according to the present invention can render the convenience of implementing the data communication through the use of a mobile phone as a middle relaying means. In the present invention, as the foldable keyboard 30 is constructed such that it can be attached to and detached from the main housing 10 and thus its portability is increased. It is possible to transmit data to the main housing 10 using the folder type keyboard 30 within a local area, or outside of the local area using a mobile phone to serve as a relay connection between the main housing 10 and the keyboard 30.

Figure 5:
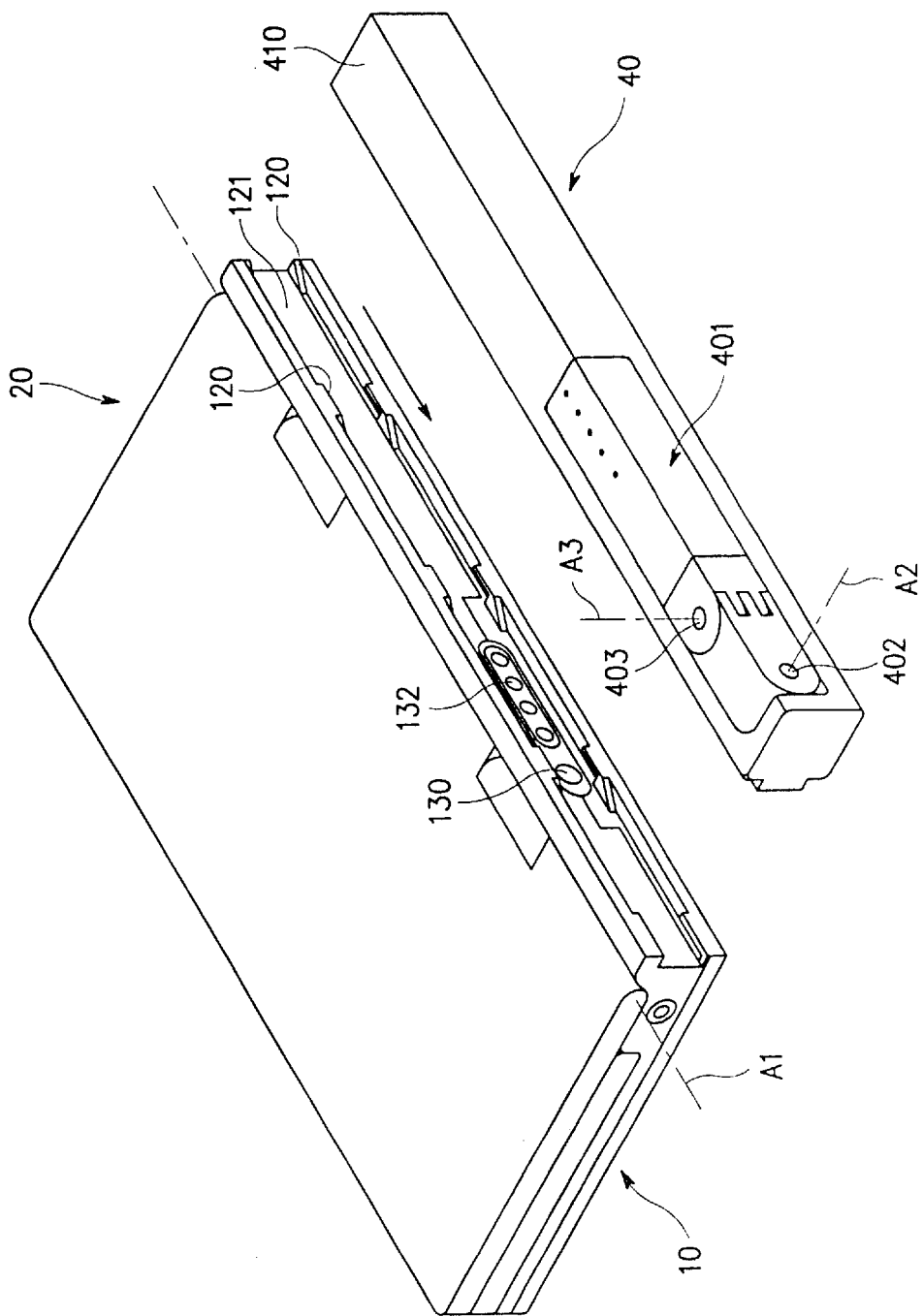
FIG. 5 is a perspective view illustrating the state wherein the antenna housing is dismounted from the main housing in accordance with the preferred embodiment of the present invention.
Figure 6:
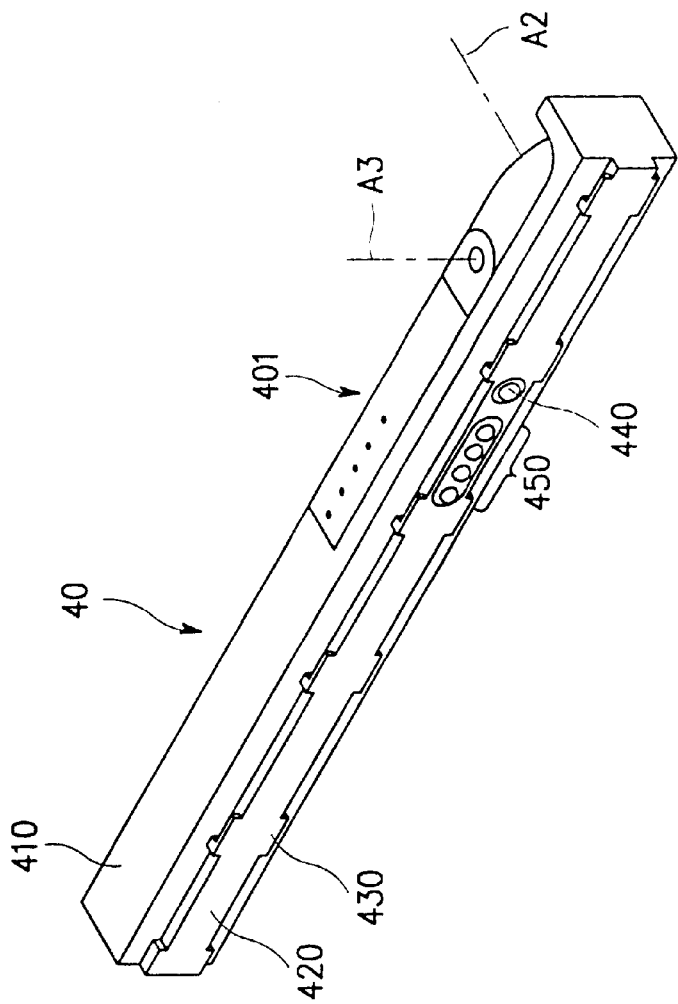
FIG. 6 is a perspective view illustrating the antenna housing independently in accordance with the preferred embodiment of the present invention; and, FIG. 7 is a cross-sectional view illustrating the structure of an RF terminal which is furnished to the antenna housing in accordance with the preferred embodiment of the present invention.

As shown in FIGS. 5 and 6 and as described above, the portable terminal for the GMPCS according to the present invention is configured in a manner such that the antenna housing 40 can be selectively mounted to and dismounted from the main housing 10. The antenna housing 40 defines a space in which the satellite antenna 401 is disposed thereon, and a battery cell (not shown) is arranged in a remaining marginal space 410 in the antenna housing 40. As described above, in the portable terminal for the GMPCS according to the present invention, the antenna housing 40 can be mounted to and dismounted from the main housing 10. To this end, the attachment and detachment means or the detachable means are provided between the main housing 10 and the antenna housing 40, and the guide means for slidingly mounting the antenna housing 40 to the main housing 10 is provided according to the present invention. In addition, the portable terminal for the GMPCS according to the present invention further includes a connection means for electrically connecting the main housing 10 and the antenna housing 40 to each other.

The connection means between the main housing 110 and the antenna housing 40 comprises the first connection means and the second connection means. The first connection means comprises a pair of RF terminals 130 and 440, and the second connection means comprises four pairs of charging terminals 132 and 450. The first connection means 130 and 440 function to electrically connect the antenna 401 to the main housing 10, and the second connection means 132 and 450 function to electrically connect the battery cell to the main housing 10.

As described above, while the guide means is provided to detachably mount the antenna housing 40 to the main housing 10, the guide means comprises a plurality of guide protrusions 120 and 430. The guide means is located at the rear end of the main housing 10 and at the front end of the antenna housing 40. The guide means enables the antenna housing 40 to be mounted to the main housing 10 by being slidingly pushed in a direction indicated by an arrow in FIG. 5. The guide means also enables the antenna housing 40 to be dismounted from the main housing 10 by being slidingly pulled in the opposite direction of the arrow.

As shown in FIG. 5, a recess 121 is defined at the rear end of the main housing 10 in a manner such that it extends in a width-wise direction of the portable terminal. The plurality of guide protrusions 120 and several RF terminals are located in the recess 121. That is to say, the RF terminal 130 and four charging terminals 132 are positioned on the bottom surface of the recess 121.

As shown in FIG. 6, the antenna housing 40 has a projected part 420 which extends in the width-wise direction of the portable terminal, and a plurality of guide protrusions 430 are formed along the upper and the lower ends of the projected part 420. At this time, the RF terminal 440 and the four charging terminals 450 are positioned on the outer surface of the projected part 420 in such a manner that they are projectedly exposed to the outside. The RF terminal 440 and the four charging terminals 450 are arranged in such a manner that the semi-spherical portions of the RF terminal 440 and the four charging terminals 450 are exposed to the outside from the outer surface of the projected part 420.

Figure 7:
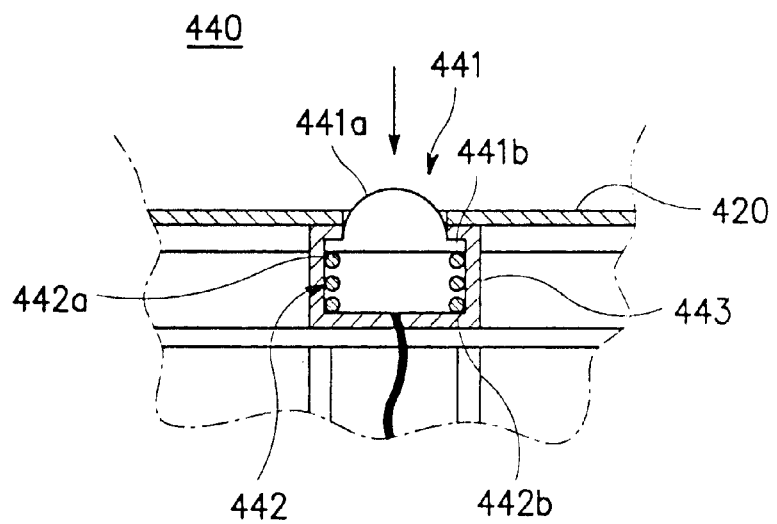

Hereinafter, the structure of the terminal elements, which are provided to the antenna housing 40 will be described in detail with reference to FIG. 7. The RF terminal will be illustrated as an example. As the RF terminal and the charging terminals have the same structure, the description for the structure of the charging terminals will be omitted herein.

The RF terminal 440 includes a terminal cap 441, a terminal housing 443 which protects the terminal cap 441 and keeps a portion of the terminal cap 441 therein, and a coil spring 442 which is arranged between the terminal cap 441 and the terminal housing 443. The terminal cap 441, the terminal housing 443, and the coil spring 442 are made of 1conductive material. The terminal cap 441 has a semi-spherical exposed portion 441a and a flange portion 441b which is kept within the terminal housing 443. The terminal housing 443 defines a space for accommodating the terminal cap 441. One end 442a of the coil spring 442 is always brought in contact with the flange portion 441b of the terminal cap 441, and the other end 442b of the coil spring 442 is always brought in contact with the bottom surface of the terminal housing 443. As the terminal cap 441 is always biased by the elastic force of the coil spring 442, the motion of the terminal cap 441 is limited to upward and downward directions in the terminal housing 443, as shown in the plane of FIG. 7.

In the case that the antenna housing 40 is mounted to the main housing 10, the terminal cap 441 is electrically coupled to the receptive RF terminal 130 (see FIG. 5), which is provided to the main housing 10. Upon joining the main housing 10 and the antenna housing 40, the terminal cap 441 experiences a force being pushed in a direction shown by the arrow of FIG. 7 and lowered into the terminal housing 443. Accordingly, the coil spring 442 is maintained in a compressed state. As the exposed portion 441a of the terminal cap 441 has a semi-spherical shape, the terminal cap 441 can be slidingly moved into the terminal housing 443. Namely, when the antenna housing 40 is slidingly mounted to the main housing 10, the terminal cap 441 is slidingly engaged to the bottom surface of the recess 121 and brought into close contact with the receptive terminal 130 of the main board 10.

Through the above mentioned RF terminal 440, the satellite antenna 401 can be electrically connected to an RF module (not shown) of the main housing 10.

As a result, the portable terminal for the GMPCS according to the present invention is convenient to data transmission for audio communication or picture communication. Also, as it is possible for people to conveniently carry the keyboard in a state wherein the keyboard is detached from the main housing, user convenience is improved.

As described above, the present invention provides advantages in that, as the portable terminal incorporates a BLUETOOTH device, it is possible for people to conveniently carry a foldable keyboard to transmit and receive a variety of data. Furthermore, it is possible to communicate with another party while carrying only the foldable, while leaving the main housing in a remote area such as home or office, by using a mobile phone equipped with BLUETOOTH functionality to serve as a middle connection to enable the audio transmission or the picture transmission.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A portable terminal for providing global, mobile personal communication by satellite (GMPCS), comprising:
    a main housing having an upper part;
    a sub-housing having an LCD for displaying a variety of information and a lens located next to the LCD for providing picture communication;
    a hinge means rotatably coupled to said sub-housing and said main housing for allowing the opening and closing of said sub-housing with respect to said main housing;
    for inputting data, a foldable keyboard comprising
        a first keyboard housing;
        a second keyboard housing; and
        a single keyboard hinge means configured for rotatable connecting said first keyboard housing and said second keyboard housing to each other and configured so that the keyboard is rotatable unfoldable by rotating either or both of said first keyboard housing and said second keyboard housing;
    a detachable means for attaching and detaching the keyboard to and from said upper part of the main housing, said detachable means comprising at least one circle-shaped projection element coupled to said main housing and at least one circle-shaped groove element corresponding to said projection element coupled to said keyboard to engage said keyboard onto said main housing;
    a data communication means equipped to respective said main housing and said keyboard for interfacing wireless data communication between said main housing and said keyboard;
    an antenna housing having a satellite communication antenna and a battery cell for supplying electrical power to said main housing;
    a first connection means for electrically connecting said main housing and said satellite communication antenna to each other;
    a second connection means for electrically connecting said main housing and said battery cell to each other; and
    a guide means for slidably mounting said antenna housing onto said main housing.

2. The portable terminal of claim 1, wherein said projection element and said groove element are magnets.

3. The portable terminal of claim 1, said terminal further comprising a holding means for engaging said keyboard onto said main housing.

4. The portable terminal of claim 3, wherein said first holding means comprises at least one magnetic projection element coupled to said keyboard and at least one magnetic groove element corresponding to said magnetic projection element coupled to said main housing to engage said key board onto said main housing.

5. The portable terminal of claim 1, said terminal further comprising:
    a holding means for engaging said keyboard onto said main housing.

6. The portable terminal of claim 5, wherein said holding means comprises at least one projection coupled to said main housing and at least one groove coupled to said keyboard to engage said keyboard onto said housing.

7. The portable terminal of claim 1, wherein the first connection means comprises:
    a conductive charging element;
    a conductive coil spring for electrically supporting one end of said conductive charging element;
    a terminal housing having an opening disposed in said antenna housing for keeping the one end of said conductive charging element coupled to said conductive coil spring therein and for allowing the other end of said conductive charging element protruding from the surface of said antenna housing through said opening; and
    a receptive element coupled to one end of said main housing for receiving said conductive charging element.

8. The portable terminal for GMPCS of claim 1, wherein said second connection means comprises:
    a conductive charging element;
    a conductive coil spring for electrically supporting one end of said conductive charging element;
    a terminal housing having an opening disposed in said antenna housing for keeping the one end of said conductive charging element coupled to said conductive coil spring therein and for allowing the other end of said conductive charging element protruding from the surface of said antenna housing through said opening; and
    a receptive element coupled to one end of said main housing for receiving said conductive charging element.

9. The portable terminal of claim 1, wherein said data communication means operates in accordance with at least one of an infrared data association (IrDA) protocol and a BLUETOOTH protocol.

10. The portable terminal of claim 1, wherein said main housing having a guiding holder member formed along the rear end of said main housing for limiting the opening and closing of said sub-housing with respect to said main housing at a predetermined angle.

11. The portable terminal of claim 1, wherein said satellite communication antenna is rotatably coupled at one end to said antenna housing.

12. The portable terminal of claim 1, wherein said guiding means comprises:

a projected element extending along the lateral side of said antenna housing, said projected element having a plurality of first guide protrusions extending from said projected element in a widthwise direction of said antenna housing; and a plurality of second guide protrusions extending from the lateral side of said main housing in a widthwise direction forming a recess along the central lateral side of said main housing, wherein said plurality of first guide protrusions are slidably engaged with said plurality of said second guide protrusions allowing said projected element to be mounted in said recess.

13. The portable terminal of claim 1, said terminal further comprising a mobile phone having said data communication means for relaying an information signal between said main housing and said keyboard.

14. The portable terminal of claim 13, wherein said mobile terminal comprises a display unit for displaying the information signal between said main housing and said keyboard.

* * * * *